(12) United States Patent
Singla et al.

(10) Patent No.: US 10,931,477 B2
(45) Date of Patent: Feb. 23, 2021

(54) LAYER TWO NETWORK TUNNELS FOR WI-FI CLIENT BRIDGING IN A DISTRIBUTED WI-FI NETWORK

(71) Applicant: Plume Design, Inc., Palo Alto, CA (US)

(72) Inventors: Aman Singla, Saratoga, CA (US); Paul White, Burlingame, CA (US); Srinivasa Tagirisa, Cupertino, CA (US)

(73) Assignee: Plume Design, Inc., Palo Alto, CA (US)

(*) Notice: Subject to any disclaimer, the term of this patent is extended or adjusted under 35 U.S.C. 154(b) by 0 days.

(21) Appl. No.: 15/463,194

(22) Filed: Mar. 20, 2017

(65) Prior Publication Data

US 2017/0272273 A1 Sep. 21, 2017

Related U.S. Application Data

(60) Provisional application No. 62/310,599, filed on Mar. 18, 2016.

(51) Int. Cl.
| | | |
|---|---|---|
| *H04L 12/46* | (2006.01) | |
| *H04L 29/12* | (2006.01) | |
| *H04W 84/12* | (2009.01) | |
| *H04W 76/12* | (2018.01) | |
| *H04L 29/08* | (2006.01) | |

(52) U.S. Cl.
CPC ...... *H04L 12/4633* (2013.01); *H04L 61/2015* (2013.01); *H04W 76/12* (2018.02); *H04W 84/12* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,315,533 | B2 | 1/2008 | Theobold et al. |
| 7,414,978 | B2 | 8/2008 | Lun et al. |
| 7,953,403 | B2 | 5/2011 | Nientiedt |
| 8,798,021 | B2 | 8/2014 | Mangalvedhe et al. |
| 9,060,279 | B2 | 6/2015 | Ganu et al. |
| 9,066,251 | B2 | 6/2015 | Madan et al. |
| 9,131,391 | B2 | 9/2015 | Madan et al. |
| 9,131,392 | B2 | 9/2015 | Madan et al. |
| 9,420,528 | B2 | 8/2016 | Madan et al. |
| 9,497,700 | B2 | 11/2016 | Madan et al. |
| 9,510,214 | B1 | 11/2016 | Balasubramaniam et al. |
| 9,516,579 | B1 | 12/2016 | Diner et al. |

(Continued)

*Primary Examiner* — Gregory B Sefcheck
*Assistant Examiner* — Suk Jin Kang
(74) *Attorney, Agent, or Firm* — Clements Bernard Walker; Lawrence A. Baratta, Jr.; Jacob P. Beers

(57) ABSTRACT

A Wi-Fi network configured for Wi-Fi client bridging using Layer 2 (L2) tunnels includes a plurality of access points each being one or more of a parent node, a child node, and a gateway node in the Wi-Fi network; wherein the plurality of access points are interconnected in a tree via a plurality of backhaul links and wherein each of the plurality of access points are configured to communicate with Wi-Fi client devices via a plurality of client links; and wherein each of the plurality of backhaul links is formed via a Layer 2 (L2) tunnel over a backhaul Wi-Fi interface between each parent node and each child node.

17 Claims, 9 Drawing Sheets

(56) References Cited

U.S. PATENT DOCUMENTS

| | | | |
|---|---|---|---|
| 2005/0124329 A1* | 6/2005 | Yadav | H04W 88/04 455/417 |
| 2006/0039360 A1* | 2/2006 | Thawani | H04W 8/20 370/352 |
| 2006/0098592 A1* | 5/2006 | Proctor, Jr. | H04B 7/026 370/315 |
| 2006/0258395 A1 | 11/2006 | Cave et al. | |
| 2006/0268823 A1* | 11/2006 | Kim | H04W 72/005 370/349 |
| 2006/0274792 A1* | 12/2006 | Abhishek | H04W 48/16 370/395.52 |
| 2006/0285510 A1* | 12/2006 | Kim | H04W 88/02 370/312 |
| 2007/0038743 A1* | 2/2007 | Hellhake | H04L 29/12283 709/224 |
| 2007/0149172 A1 | 6/2007 | Dickinson | |
| 2007/0206537 A1* | 9/2007 | Cam-Winget | H04W 12/06 370/331 |
| 2007/0217427 A1* | 9/2007 | Chung | H04L 12/4641 370/395.2 |
| 2007/0242621 A1 | 10/2007 | Nandagopalan et al. | |
| 2007/0250713 A1* | 10/2007 | Rahman | H04N 21/4126 713/171 |
| 2008/0013473 A1* | 1/2008 | Proctor, Jr. | H04W 88/085 370/315 |
| 2008/0043637 A1* | 2/2008 | Rahman | H04L 45/22 370/254 |
| 2008/0112363 A1* | 5/2008 | Rahman | H04W 8/005 370/331 |
| 2009/0067441 A1* | 3/2009 | Ansari | H04L 12/2814 370/401 |
| 2009/0257380 A1 | 10/2009 | Meier | |
| 2009/0279427 A1 | 11/2009 | Ji et al. | |
| 2009/0316585 A1 | 12/2009 | Srinivasan | |
| 2009/0323632 A1 | 12/2009 | Nix | |
| 2010/0113039 A1* | 5/2010 | Iyer | H04W 16/32 455/449 |
| 2010/0275017 A1* | 10/2010 | Iyer | H04L 12/2859 713/162 |
| 2010/0281180 A1* | 11/2010 | Iyer | H04L 67/104 709/234 |
| 2011/0004913 A1* | 1/2011 | Nagarajan | H04L 63/102 726/1 |
| 2011/0039554 A1 | 2/2011 | Bims | |
| 2011/0151886 A1 | 6/2011 | Grayson et al. | |
| 2011/0158127 A1* | 6/2011 | Duo | H04W 48/16 370/254 |
| 2011/0264730 A1* | 10/2011 | Dattagupta | H04L 12/2809 709/203 |
| 2011/0264915 A1* | 10/2011 | Cam-Winget | H04L 63/162 713/171 |
| 2012/0002567 A1 | 1/2012 | Sun et al. | |
| 2012/0020344 A1* | 1/2012 | Iyer | H04W 16/32 370/338 |
| 2012/0039230 A1* | 2/2012 | Blanchette | H04L 45/66 370/312 |
| 2012/0087268 A1 | 4/2012 | Savoor et al. | |
| 2012/0087281 A1* | 4/2012 | Rahman | H04W 8/005 370/255 |
| 2012/0122503 A1 | 5/2012 | Ma et al. | |
| 2012/0230491 A1* | 9/2012 | Duo | H04W 48/16 380/270 |
| 2012/0257585 A1 | 10/2012 | Sydor et al. | |
| 2013/0201857 A1 | 8/2013 | Bhargava et al. | |
| 2013/0272285 A1 | 10/2013 | Goldsmith et al. | |
| 2014/0003331 A1* | 1/2014 | Klein | H04B 3/50 370/328 |
| 2014/0086215 A1* | 3/2014 | Duo | H04W 48/16 370/332 |
| 2014/0092765 A1 | 4/2014 | Agarwal et al. | |
| 2014/0126410 A1 | 5/2014 | Agarwal et al. | |
| 2014/0135024 A1* | 5/2014 | Roddy | H04W 72/0486 455/445 |
| 2014/0247941 A1* | 9/2014 | Gu | H04L 63/062 380/270 |
| 2014/0280733 A1* | 9/2014 | Iyer | H04L 67/104 709/217 |
| 2014/0289338 A1* | 9/2014 | Iyer | H04L 67/104 709/205 |
| 2014/0328190 A1 | 11/2014 | Lord et al. | |
| 2014/0364130 A1* | 12/2014 | Murphy | H04W 12/06 455/445 |
| 2015/0024771 A1* | 1/2015 | Roddy | H04W 72/0486 455/452.2 |
| 2015/0049714 A1* | 2/2015 | Ghai | H04W 76/10 370/329 |
| 2015/0055501 A1* | 2/2015 | Duo | H04W 48/16 370/252 |
| 2015/0085699 A1* | 3/2015 | Ho | H04W 16/10 370/254 |
| 2015/0156815 A1* | 6/2015 | Pang | H04W 84/12 370/338 |
| 2015/0373672 A1* | 12/2015 | Forssell | H04L 47/76 370/329 |
| 2016/0007273 A1* | 1/2016 | Farid | H04W 16/02 370/329 |
| 2016/0021684 A1* | 1/2016 | Lewis | H04W 76/02 370/329 |
| 2016/0080949 A1 | 3/2016 | Chandrasekhar et al. | |
| 2016/0087838 A1* | 3/2016 | Kim | H04L 41/12 709/224 |
| 2016/0088521 A1* | 3/2016 | Ho | H04L 43/08 455/453 |
| 2016/0088551 A1* | 3/2016 | Murphy | H04W 12/06 370/329 |
| 2016/0212755 A1* | 7/2016 | Cao | H04W 40/12 |
| 2016/0219589 A1* | 7/2016 | Khawer | H04W 72/0453 |
| 2016/0285751 A1* | 9/2016 | Pang | H04W 84/12 |
| 2016/0373925 A1* | 12/2016 | Li | H04W 12/06 |
| 2017/0019375 A1* | 1/2017 | Garg | H04L 63/0281 |
| 2017/0048700 A1* | 2/2017 | Huang | H04W 12/04 |
| 2017/0135022 A1* | 5/2017 | Amini | H04L 12/44 |
| 2017/0135104 A1* | 5/2017 | Emmanuel | H04L 12/44 |
| 2017/0208032 A1* | 7/2017 | Cox | H04L 61/103 |
| 2017/0208502 A1* | 7/2017 | Ho | H04W 28/08 |
| 2017/0208602 A1* | 7/2017 | Ling | H04W 24/02 |
| 2017/0230891 A1* | 8/2017 | Fang | H04W 40/22 |
| 2017/0346729 A1* | 11/2017 | Pang | H04L 45/28 |
| 2018/0041951 A1* | 2/2018 | Kim | H04W 48/16 |
| 2018/0054717 A1* | 2/2018 | Navalekar | H04L 1/00 |
| 2018/0084482 A1* | 3/2018 | Fang | H04W 84/047 |
| 2018/0092012 A1* | 3/2018 | Murphy | H04L 12/4641 |
| 2018/0183754 A1* | 6/2018 | Guo | H04L 63/0428 |
| 2018/0288768 A1* | 10/2018 | Emmanuel | H04L 12/44 |
| 2019/0007947 A1* | 1/2019 | Amini | H04L 43/0888 |

* cited by examiner

LAYER TWO NETWORK TUNNELS FOR WI-FI CLIENT BRIDGING IN A DISTRIBUTED WI-FI NETWORK

CROSS-REFERENCE TO RELATED APPLICATION(S)

The present patent/application claims priority to U.S. Provisional Patent Application No. 62/310,599, filed Mar. 18, 2016, and entitled "L2 NETWORK TUNNELS FOR WI-FI CLIENT BRIDGING," the contents of which are incorporated by reference.

FIELD OF THE DISCLOSURE

The present disclosure generally relates to wireless networking systems and methods. More particularly, the present disclosure relates to claiming network devices for a Layer 2 (L2) network tunnels for Wi-Fi client bridging in a distributed Wi-Fi network.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where the range is determined by the long range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3x the airtime, generating 3x the interference to neighboring Wi-Fi networks.

BRIEF SUMMARY OF THE DISCLOSURE

In an exemplary embodiment, a Wi-Fi network with a plurality of access points configured for Wi-Fi client bridging using Layer 2 (L2) tunnels includes a plurality of access points each being one or more of a parent node, a child node, and a gateway node in the Wi-Fi network; wherein the plurality of access points are interconnected in a tree via a plurality of backhaul links and wherein each of the plurality of access points are configured to communicate with Wi-Fi client devices via a plurality of client links; and wherein each of the plurality of backhaul links is formed via a Layer 2 (L2) tunnel over a backhaul Wi-Fi interface between each parent node and each child node. The child node can be an intermediate device in the Wi-Fi network between a Wi-Fi client device and a gateway node, and wherein the backhaul links can support IEEE 802.11 compliant frames through the intermediate device via the L2 tunnel. The parent node can be a gateway device in the Wi-Fi network connected to one or more child nodes including access points in the in the Wi-Fi network using the L2 tunnel interface. The parent node can be configured to connect to a cloud service upon powering up and wherein the cloud service configures the L2 tunnel interface.

The L2 tunnel on each of the plurality of backhaul links can be configured based on an agreed upon Internet Protocol (IP) address convention for the parent node of each L2 tunnel. The plurality of backhaul links can use a predefined Service Set Identifier (SSID) which is known to each of the plurality of access points. The Wi-Fi network can support a plurality of data paths including a data path between Wi-Fi client devices connected to a same access point, a data path between Wi-Fi client devices connected to different access points, and a data path between a Wi-Fi client device and an external device via a gateway node in the Wi-Fi network. The plurality of access points can include three logical interfaces including a client interface, a child interface for a backhaul link, and a parent interface for a backhaul link. Each of the plurality of access points can operate Dynamic Host Configuration Protocol (DHCP) on the parent interface to provide addresses to one or more child nodes. A cloud service can be configured to configure Dynamic Host Configuration Protocol (DHCP) on the parent interface. The plurality of access points can utilize a first Service Set Identifier (SSID) for the client links and a second SSID for the backhaul links.

In another exemplary embodiment, an access point in a Wi-Fi network configured for Wi-Fi client bridging includes a plurality of radios communicating on the Wi-Fi system; and a plurality of network interfaces communicatively coupled to the plurality of radios, wherein the network interfaces include a Layer 2 (L2) tunnel interface, a plurality Wi-Fi interfaces, and a bridge interface; wherein the L2 tunnel interface is communicatively coupled to a backhaul Wi-Fi interface of the plurality Wi-Fi interfaces, wherein the bridge interface is configured to communicate packets between the L2 tunnel interface and the plurality of Wi-Fi interface, and wherein the Wi-Fi network includes a plurality of nodes with intra-node communication via the L2 tunnel interface. The access point can be an intermediate device in the Wi-Fi network between a Wi-Fi client device and a gateway node and the bridge interface support IEEE 802.11 compliant frames through the intermediate device. The access point can be a gateway device in the Wi-Fi network connected to one or more child nodes including access points in the in the Wi-Fi network using the L2 tunnel interface.

The access point can be configured to connect to a cloud service upon powering up to enable an infrastructure mode on a Wi-Fi interface and to assign an Internet Protocol (IP) address thereto, and wherein the cloud service configures the L2 tunnel interface based on the IP address. The backhaul Wi-Fi interface can communicate over a radio using a predefined Service Set Identifier (SSID) which is known to each access point configured to operate in the Wi-Fi network. The Wi-Fi network can support a plurality of data paths including a data path between Wi-Fi client devices connected to the access point, a data path between Wi-Fi client devices connected to the access point and another access point, and a data path between a Wi-Fi client device and an external device via a gateway node in the Wi-Fi network. The access point can include three logical interfaces including a client interface, a child interface for a backhaul link, and a parent interface for a backhaul link. The plurality of access points can utilize a first Service Set Identifier (SSID) for client links and a second SSID for backhaul links.

In a further exemplary embodiment, a method for Wi-Fi client bridging in a Wi-Fi network includes receiving uplink data from one or more Wi-Fi client devices via a Wi-Fi network interface; forwarding the uplink data to a parent node via a Layer 2 (L2) tunnel adding a tunnel header thereon; receiving downlink data from the L2 tunnel; and transmitting the downlink data to the one or more Wi-Fi client device, wherein the Wi-Fi network includes a plurality of nodes with intra-node communication via the L2 tunnels and a plurality of L2 tunnels forming backhaul links.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
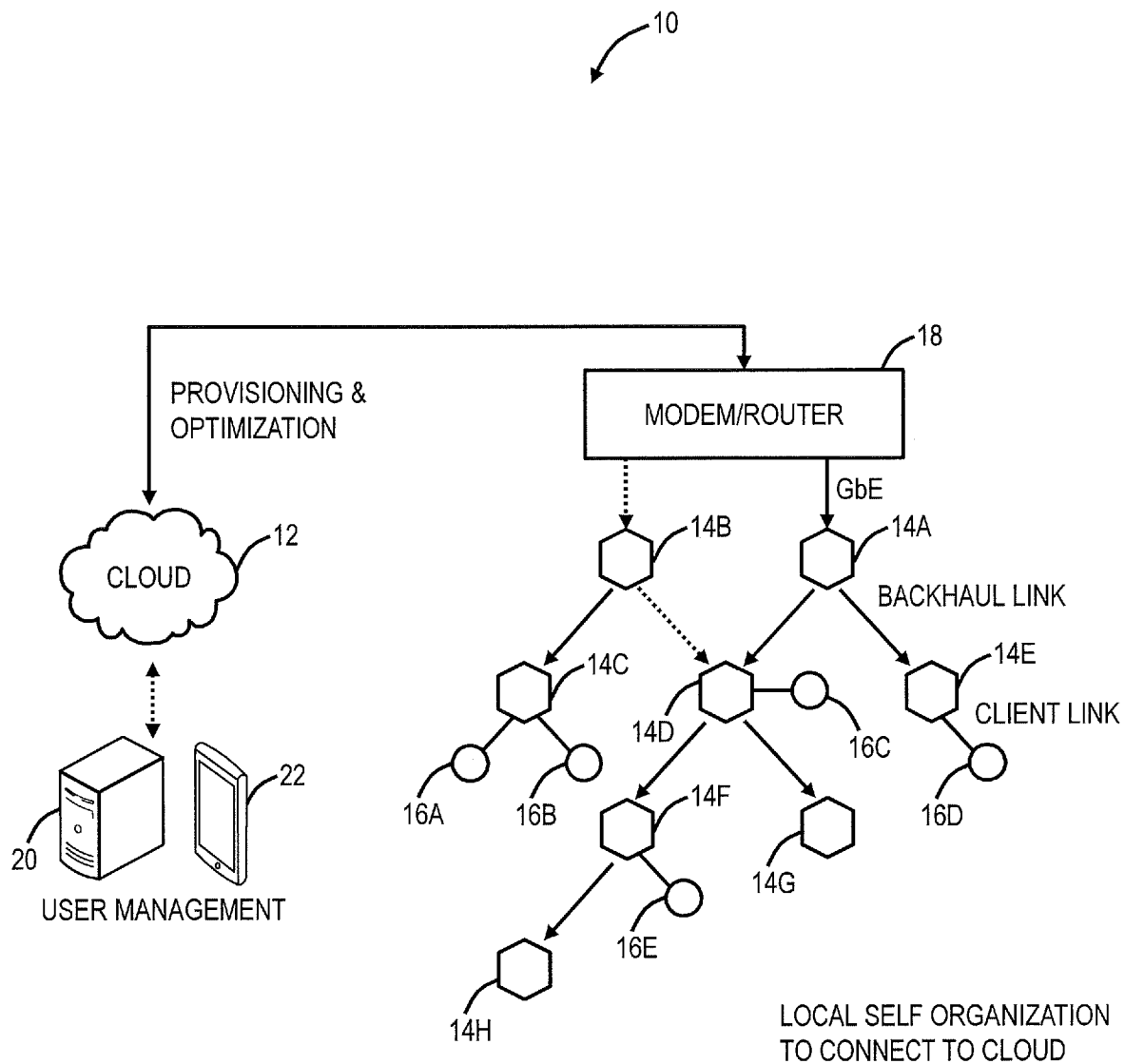
FIG. 1 is a network diagram of a distributed Wi-Fi system with cloud-based control.

Again, in various exemplary embodiments, the present disclosure relates to data gathering systems and methods to enable the optimization of distributed Wi-Fi networks. It is an objective of the systems and methods to provide a Wi-Fi network with superior performance relative to Wi-Fi networks with a single AP, with repeaters, or with multiple mesh nodes. The systems and methods include a distributed Wi-Fi system with a plurality of access points (nodes) which are self-optimizing based on cloud-based control. This self-optimization adapts the topology and configuration of the plurality of access points in real-time based on the operating environment. The plurality of access points communicate with one another via backhaul links and to Wi-Fi client devices via client links, and the each of the backhaul links and each of the client links may use different channels based on the optimization, thereby avoiding the aforementioned limitations in Wi-Fi mesh or repeater systems. In an exemplary aspect, the distributed Wi-Fi system includes a relatively large number of access points (relative to conventional deployments including Wi-Fi mesh or repeater systems). For example, the large number of access points can be 6 to 12 or more in a typical residence. With a large number of access points, the distance between any two access points is small, on a similar scale as the distance between an access point and Wi-Fi client device. Accordingly, signal strength is maintained avoiding coverage issues, and with the optimization of the topology and configuration, congestion and interference are minimized. Thus, the distributed Wi-Fi system addresses all three of the aforementioned limitations in conventional Wi-Fi systems.

In conventional IEEE 802.11, distributed Wi-Fi networking is limited and requires either modification of the standards for a non-standard approach or use of network routing protocols. In various exemplary embodiments, to support distributed Wi-Fi networking in order to ensure that all existing Wi-Fi clients will be able to connect to the distributed Wi-Fi network, the systems and methods use Layer 2 (L2) network tunnels and software bridge interfaces. These interfaces are present on each of the access points becoming part of the distributed Wi-Fi network. To ensure full network service to all clients, the systems and methods connect Wi-Fi access points between each other using L2 network tunnels running over Wi-Fi and connect L2 interfaces to bridge interfaces running on each access point. This approach ensures that all clients connecting to a distributed Wi-Fi network could communicate to each other using L2 or higher network protocols. It also ensures that every client may reach all public network services via the gateway node. Logically, the systems and methods make a distributed Wi-Fi solution the full equivalent of single Wi-Fi access point solution. Specifically, the systems and methods solve the problem of using an intermediate Wi-Fi client as a network bridge when establishing a connection through that bridge device between a Wi-Fi client and Wi-Fi access point. The systems and methods are applicable to any IEEE 802.11 network, but it is particularly useful for distributed Wi-Fi network solutions (multiple access points). The systems and methods ensure full network connectivity for all clients connected to it, even when these client's traffic travels via multiple hops through intermediate Wi-Fi devices.

Distributed Wi-Fi System

Referring to FIG. 1, in an exemplary embodiment, a network diagram illustrates a Referring to FIG. 1, in an exemplary embodiment, a network diagram illustrates a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an exemplary aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on a local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
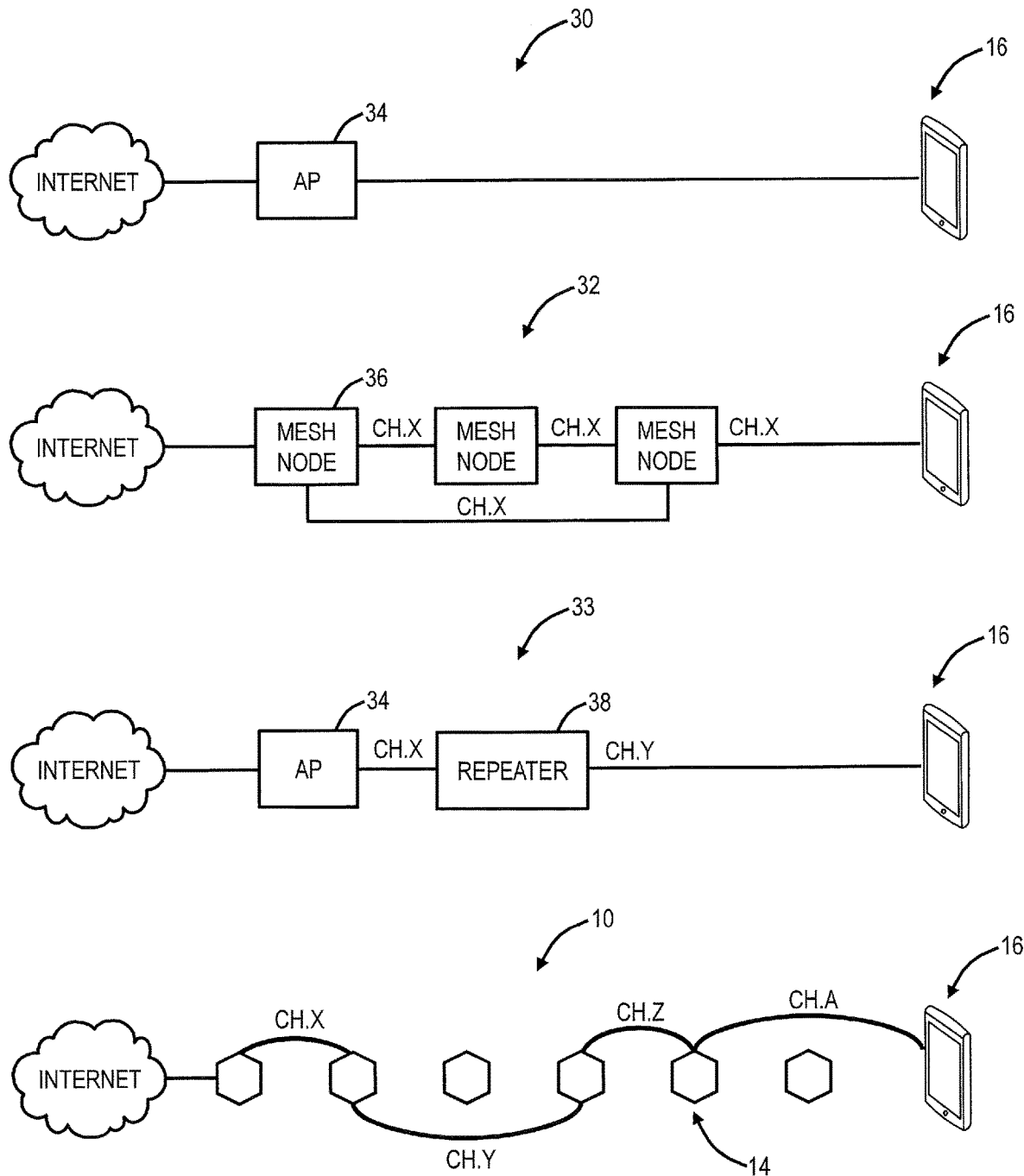
FIG. 2 is a network diagram of differences in operation of the distributed Wi-Fi system of FIG. 1 relative to a conventional single access point system, a Wi-Fi mesh network, and a Wi-Fi repeater system.

Referring to FIG. 2, in an exemplary embodiment, a network diagram illustrates differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an exemplary aspect, the servers 20 in the cloud 12 are configured to optimize channel selection for the best user experience.

Configuration and Optimization Process for the Distributed Wi-Fi System

Figure 3:
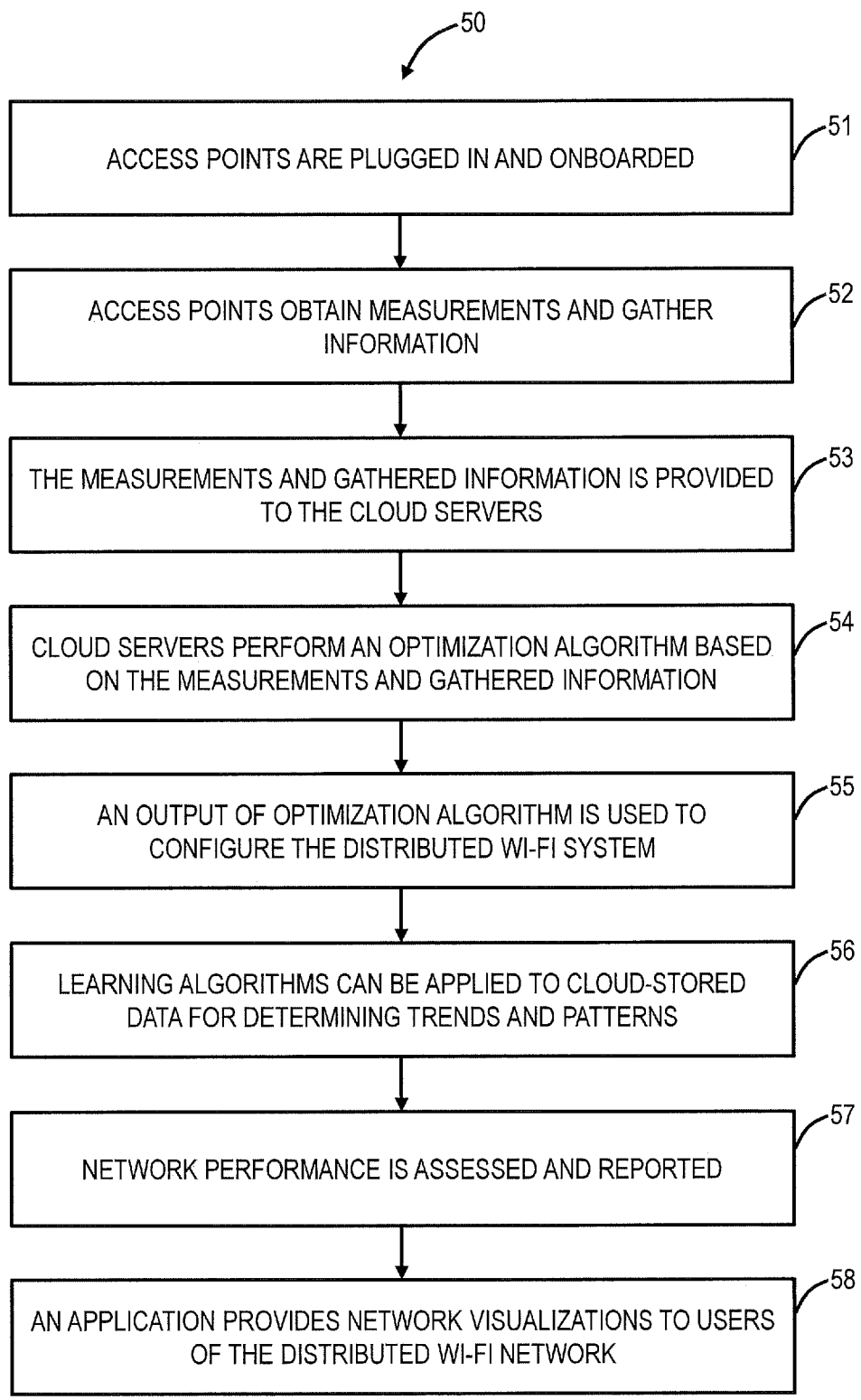
FIG. 3 is a flowchart of a configuration and optimization process for the distributed Wi-Fi system of FIG. 1.
Figure 4:
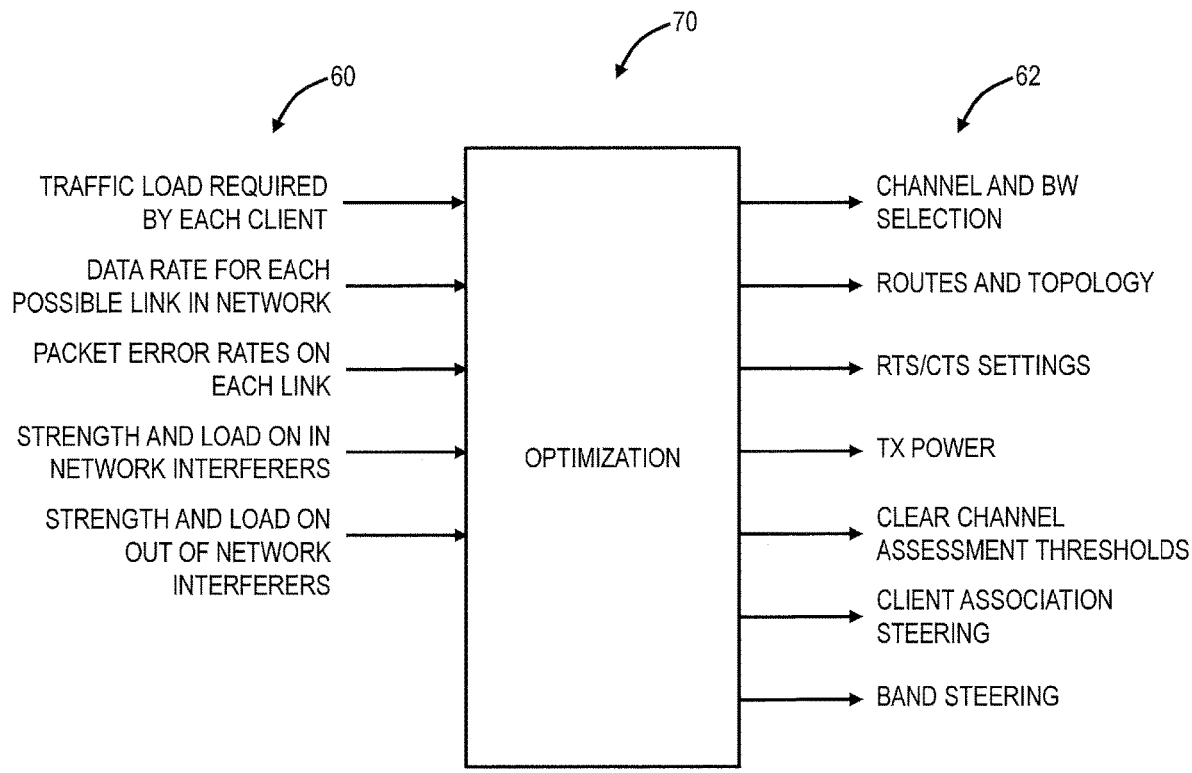
FIG. 4 is a block diagram of inputs and outputs to an optimization as part of the configuration and optimization process of FIG. 3.

Referring to FIG. 3, in an exemplary embodiment, a flowchart illustrates a configuration and optimization process 50 for the distributed Wi-Fi system 10. Specifically, the configuration and optimization process 50 includes various steps 51-58 to enable efficient operation of the distributed Wi-Fi system 10. These steps 51-58 may be performed in a different order and may be repeated on an ongoing basis, allowing the distributed Wi-Fi system 10 to adapt to changing conditions. First, each of the access points 14 are plugged in and onboarded (step 51). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 51 ensures a newly installed access point 14 connects to the distributed Wi-Fi system 10 so that the access point can receive commands and provide data to the servers 20. The onboarding step 51 can include configuring the access point with the correct Service Set Identifier (SSID) (network ID) and associated security keys. In an exemplary embodiment, the onboarding step 51 is performed with Bluetooth or equivalent connectivity between the access point 14 and a user device 22 allowing a user to provide the SSID, security keys, etc. Once onboarded, the access point 14 can initiate communication with the distributed Wi-Fi system 10 to the servers 20 for configuration.

Second, the access points 14 obtain measurements and gather information to enable optimization of the networking settings (step 52). The information gathered can include signal strengths and supportable data rates between all nodes as well as between all nodes and all Wi-Fi client devices 16. Specifically, the measurement step 52 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 52 is provided to the servers 20 in the cloud 12 (step 53). The steps 51-53 are performed on location at the distributed Wi-Fi system 10.

These measurements in steps 52, 53 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 54). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 10 (step 55). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 56). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 57). Eighth, an application (such as a mobile app operating on the user device 22) can provide a user visibility into the network operation (step 58). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 50 is described herein with reference to the distributed Wi-Fi system 10 as an exemplary embodiment. Those skilled in the art will recognize the configuration and optimization process 50 can operate with any type of multiple node Wi-Fi system (i.e., a distributed Wi-Fi network or Wi-Fi system) including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed Wi-Fi network" or "Wi-Fi system" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Referring to FIG. 3, in an exemplary embodiment, a block diagram illustrates inputs 60 and outputs 62 to an optimization 70. The inputs 60 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 70. The outputs of the optimization 70 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 5:
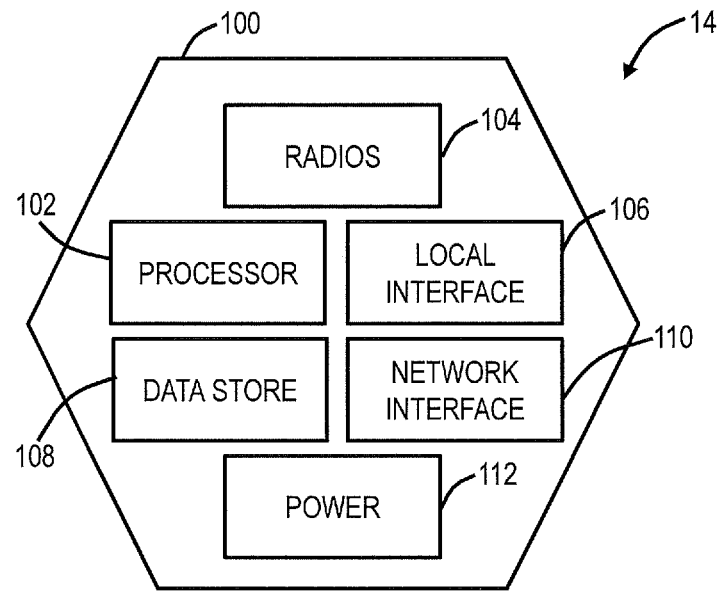
FIG. 5 is a block diagram of functional components of the access point in the distributed Wi-Fi system of FIG. 1.

Referring to FIG. 5, in an exemplary embodiment, a block diagram illustrates functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 5 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connection to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an exemplary embodiment, the access points 14 support dual band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an exemplary embodiment, all of the access points 14 in the distributed Wi-Fi system 10 include the network interface 110. In another exemplary embodiment, select access points 14 which connect to the modem/router 18 or require local wired connections have the network interface 110. The network interface 110 may include, for example, an Ethernet card or adapter (e.g., 10 BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 6:
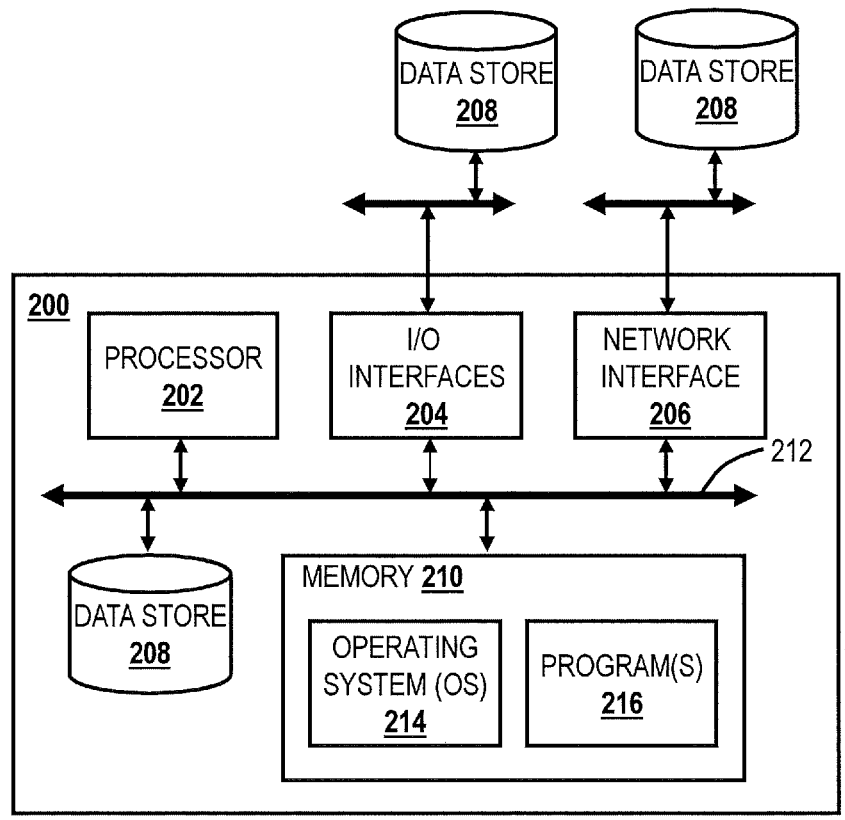
FIG. 6 is a block diagram of functional components of a server, a Wi-Fi client device, or a user device which may be used with the distributed Wi-Fi system of FIG. 1.

Referring to FIG. 6, in an exemplary embodiment, a block diagram illustrates functional components of the server 20, the Wi-Fi client device 16, or the user device 22 which may be used with the distributed Wi-Fi system 10. FIG. 6 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

IEEE 802.11 Support for Distributed Wi-Fi Networks

For infrastructure networks, all IEEE 802.11 standards support primarily a star network topology, implying that all Wi-Fi client devices 16 will connect directly to an access point 14 no matter how far from the access point 14 they are. The exception to this is the Wireless Distribution Mode (WDS) mode. However, WDS mode was only designed to handle at most two hops in the network, and is poorly supported by devices. WDS also has problems supporting encryption to provide security. These problems make WDS unattractive. Since WDS mode is largely unusable, traditional Wi-Fi infrastructure mode is the only mode that is a reasonable option for Wi-Fi networks today. However, the format of the IEEE 802.11 data frames in infrastructure mode actually prevents enabling a Wi-Fi client bridge mode. The Wi-Fi client bridge mode is required for the backhaul links in the distributed Wi-Fi system 10. The problem occurs because the IEEE 802.11 data frame does not include the entire Ethernet frame format. IEEE 802.11 frames do not carry the entire Ethernet frame to avoid excess overhead, i.e., long transmission times and low throughput would occur when transmitting over a long-distance link. This makes it effectively impossible to form a network over Wi-Fi in which Wi-Fi devices (i.e., access points 14) are daisy chained.

The solutions for this issue so far exploit one of two options, namely either modify the Wi-Fi standard and introduce a non-standard solution or use network routing protocols, to allow user traffic being forwarded through intermediate Wi-Fi devices to the destination Internet Protocol (IP) address. Any sort of modification of the Wi-Fi standard would inevitably influence all Wi-Fi clients, meaning that all already deployed Wi-Fi clients would be prevented from using such Wi-Fi service without software and most probably hardware modifications. Such approach is obviously unacceptable for most users. Because of increasing demand for this feature, terminal Wi-Fi equipment manufacturers made some Wi-Fi extensions available. These extensions are either publicly documented (like WDS—Wireless Distributed Service) or are proprietary (like WET—Wireless Ethernet Transceiver). Such Wi-Fi protocol extensions usually allow users to connect only two Wi-Fi access points, thus providing a limited distributed Wi-Fi solution. Such solutions are very often limited to single software and hardware version of the product being able to connect to a peer of the same kind.

The second group of solutions is based on the ability of most of the Wi-Fi access points to route packets. Such solutions will satisfy all typical user requirements for accessing publicly available services and content providers (colloquially know as Internet access) but will lack some services available in a typical home Wi-Fi deployment. Generally speaking, exploiting such solution will always prevent any L2 based protocols from working between clients connected to different Wi-Fi access points. In today's homes, many intranet services are based on L2 protocols, for example, all modern Microsoft Windows devices use the LLTD (Link Layer Topology Discovery) protocol. If a routing based solution for the Wi-Fi bridge client issue is applied, the LLTD protocol will not work across the home network. There is an almost endless list of similar limitations imposed by exploiting IP packet routing on Wi-Fi clients.

L2 Tunnels for Wi-Fi Client Bridging

Figure 7:
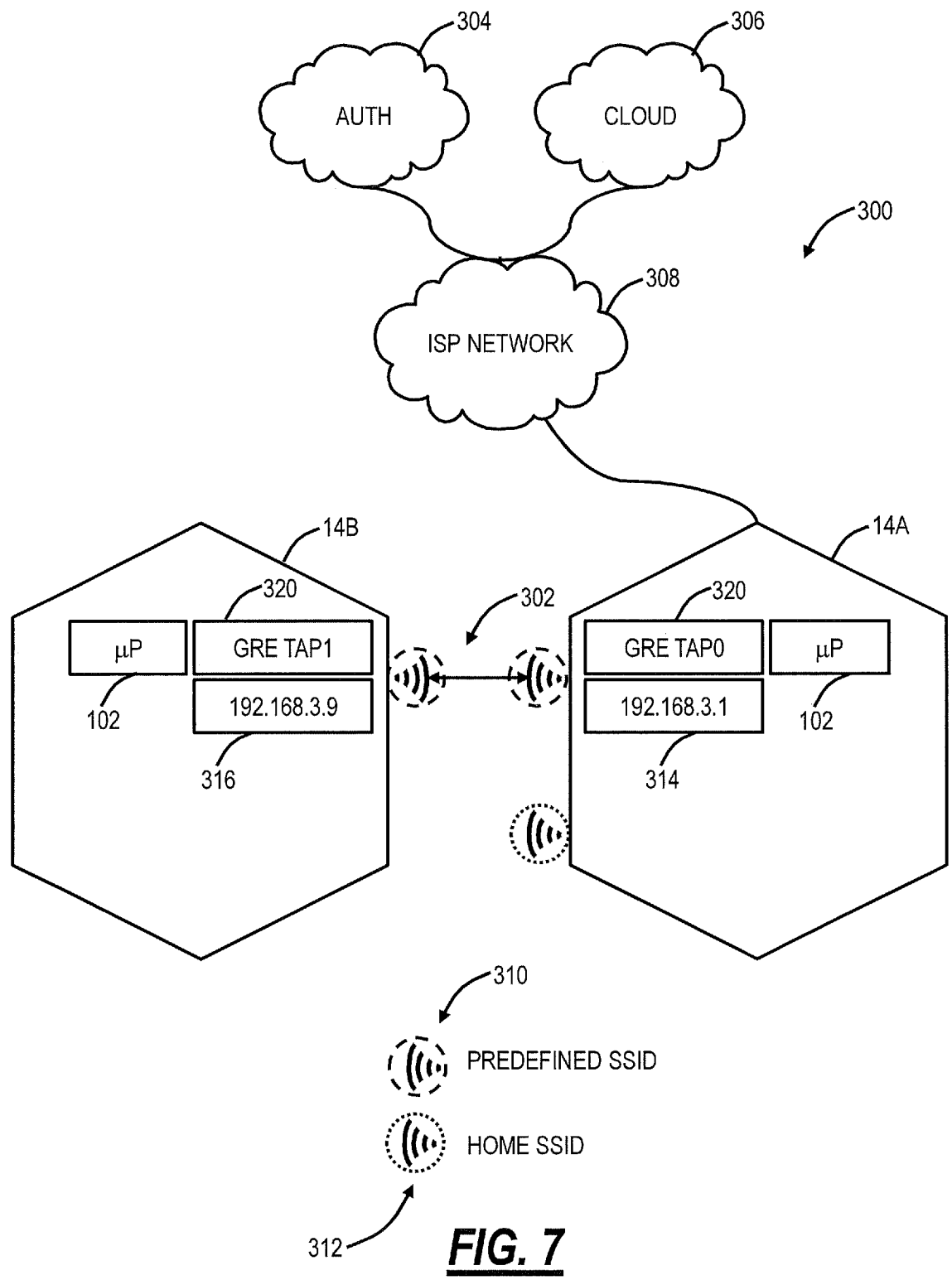
FIG. 7 is a network diagram of a Wi-Fi network with a backhaul link formed between two access points using an L2 tunnel.

Referring to FIG. 7, in an exemplary embodiment, a network diagram illustrates a Wi-Fi network 300 with a backhaul link 302 formed between two access points 14 using an L2 tunnel. The Wi-Fi network 300 can include the distributed Wi-Fi system 10. The Wi-Fi network 300 can include cloud-based control of the access points 14 such as through an authorization service 304 and a cloud configuration service 306 in the cloud 12, connected via a network 308 such as an Internet Service Provider (ISP) network. In the example of FIG. 7, there are two access points 14A, 14B—a gateway access point 14A connected to the network 308, and an access point 14B connected to the gateway access point 14A via the backhaul link 302. To enable a Wi-Fi client bridge mode, i.e., backhaul connections such as the backhaul link 302 between the access points 14, the systems and methods utilize any L2 tunnel (e.g., any Ethernet-over-IP tunnel protocol might be used).

In an exemplary embodiment, the Wi-Fi network can use Generic Routing Encapsulation (GRE) and variants thereof, e.g., GREtap. The GRE protocol essentially enables tunneling of any Ethernet packets sent to its interface to the other end of the tunnel. So this technique could be exploited with any point-to-point Layer 3 (L3) protocol. In FIG. 7, the backhaul link 302 is formed as a GRE tunnel over a predefined SSID 310. The predefined SSID 310 is used for Wi-Fi client bridging between the access points 14 to form the backhaul link 302. Note, the predefined SSID 310 is different from a home SSID 312 which is for the Wi-Fi client devices 16 to connect to the Wi-Fi network 300. In general, to establish a GRE tunnel, the following prerequisites are needed on both ends of tunnel i) a local interface IP address, ii) a remote interface IP address, and iii) the remote side must be reachable from local unit and vice versa.

In the Wi-Fi network 300, the distributed Wi-Fi system 10, or another distributed Wi-Fi network, a repeater node, i.e., the access point 14B which is not a gateway node, ends up with a least one parent node and one child node or Wi-Fi client devices 16. Thus, the repeater node (the access point 14B) has two interfaces or more. The first interface connects to the node's parent device and acts as a client or STA mode interface, i.e., the first interface provides the backhaul link 302. The second interface connects to the child or the Wi-Fi client device 16, that interface acting as an AP mode interface.

Figure 8:
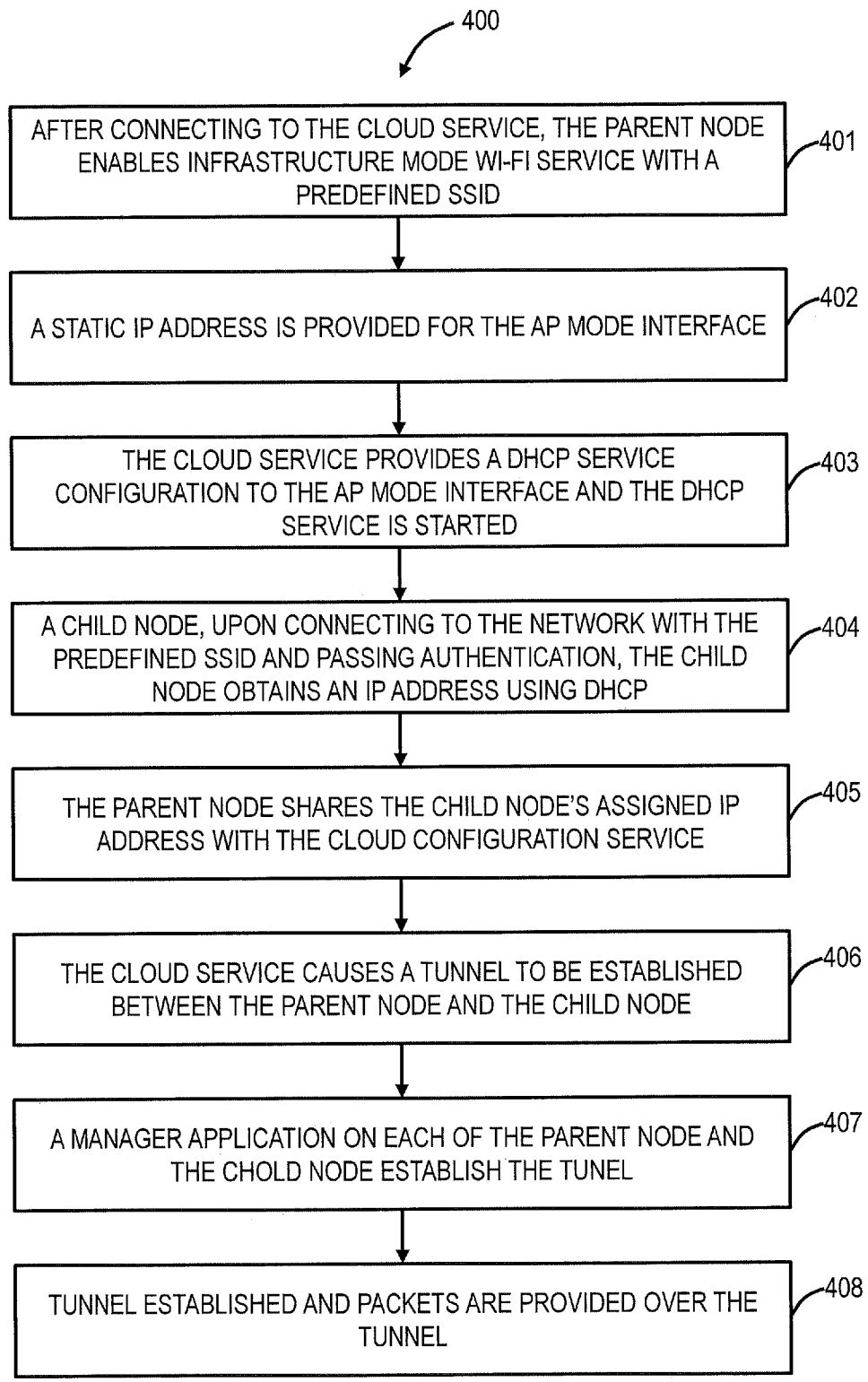
FIG. 8 is a flowchart of a tunnel establishment method for the Wi-Fi network of FIG. 7.

Referring to FIG. 8, in an exemplary embodiment, a flowchart illustrates a tunnel establishment method 400 for the Wi-Fi network 300. Again, the establishment method 400 utilizes GRE as an exemplary L2 tunnel, but those skilled in the art will recognize any L2 tunneling protocol is contemplated. Further, the establishment method 400 steps in FIG. 8 are described herein with reference to the Wi-Fi network 300 in FIG. 7, but could also operate with the distributed Wi-Fi system 10, or another distributed Wi-Fi network.

The establishment method 400 includes, after connecting to the cloud configuration service 306, the parent node (e.g., the access point 14A) enables infrastructure mode Wi-Fi service with a predefined SSID (step 401). The cloud configuration service 306 provides a static IP address to the parent node access point 14A for the AP mode interface (step 402). Specifically, the cloud configuration service 306 transfers this IP address to the parent device and the parent device assigns this IP address and the accompanying network settings to the AP mode network interface, e.g. the home SSID 312 on the access point 14A. For operation, the Wi-Fi network 300 can include an agreed upon convention such that the AP mode interface always has an IP address with a specific format, e.g., an IP address that ends with 1 or some other unique convention, no matter which IPv4 address subnet from private IPv4 addresses pool is chosen. For example, valid AP mode network interface addresses can be 192.168.3.1, 192.168.77.1, 192.168.116.1, etc. For example, in FIG. 7, the access point has AP mode network interface IP address 314.

The cloud configuration service 306 provides a Dynamic Host Configuration Protocol (DHCP) service configuration to the newly created AP mode interface (IP address 314) (step 403). The DHCP service is started on the parent device on that particular interface, i.e., the newly created AP mode interface (IP address 314). Upon connecting to the network with a predefined SSID and successfully passing network authentication, the child device (the access point 14B) obtains an IP address using DHCP (step 404). This can include obtaining an IP address by sending a DHCP discover packet and using the DHCP protocol, a child Wi-Fi network interface is assigned a single IP address 316 from the same subnet, and with the same network mask as the parent device. From a terminology perspective, the parent node or device is the gateway, connected to the network 308, and the child node or device is the access point 14B or any other access point 14 which does not directly connect to the network 308, but rather through the backhaul link 302 or multiple backhaul links. The DHCP protocol is operated by the parent node (the access point 14A).

The parent node shares the child node's assigned IP address with the cloud configuration service 306 (step 405). With the child node's assign IP address, the cloud configuration service 306 causes a tunnel to be established between the parent node and the child node (step 406). A manager application executed on the processor 102 in the access points 14 (the parent node and the child node) establishes the tunnel (step 407). Specifically, the cloud configuration service 306 can issue a request for establishment of a downlink GRE tunnel between the parent node and the child node. The manager application at the parent node can establish a GRE tunnel on the parent node. Next, the manager application running on the child node extracts the IP address subnet information based on the assigned IP and assigned subnet mask information. The manager application running on child node establishes the uplink GRE tunnel based on the agreed upon convention for the IP address 314 of the AP mode interface. For example, assuming the agreed upon convention is that the IP address that ends with 1, the child node establishes the uplink GRE tunnel due to established connection IP address of Wi-Fi interface on the parent side is equal to: SUBNET_IP_ADDRESS OR 1.

At this point, there is a fully functional tunnel established between parent Wi-Fi access point device and child Wi-Fi access point device (step 408). On each device, there is newly created GRETAP network interface 320 available. Any Ethernet packet that enters network interface on one side of this tunnel will be tunneled unmodified to the other side of the established tunnel. The only cost of this tunnel, besides a bit of additional processing of every packet, is additional bytes added as GRE header to each packet being transferred. In the case of the GRE protocol, this additional cost is exactly 36 bytes. Upon connecting nodes with this tunnel the Maximum Transmission Unit (MTU) size must be correctly increased for at least the given amount of bytes.

Establishing L2 Network Between Parent and Child Node

Figure 9:
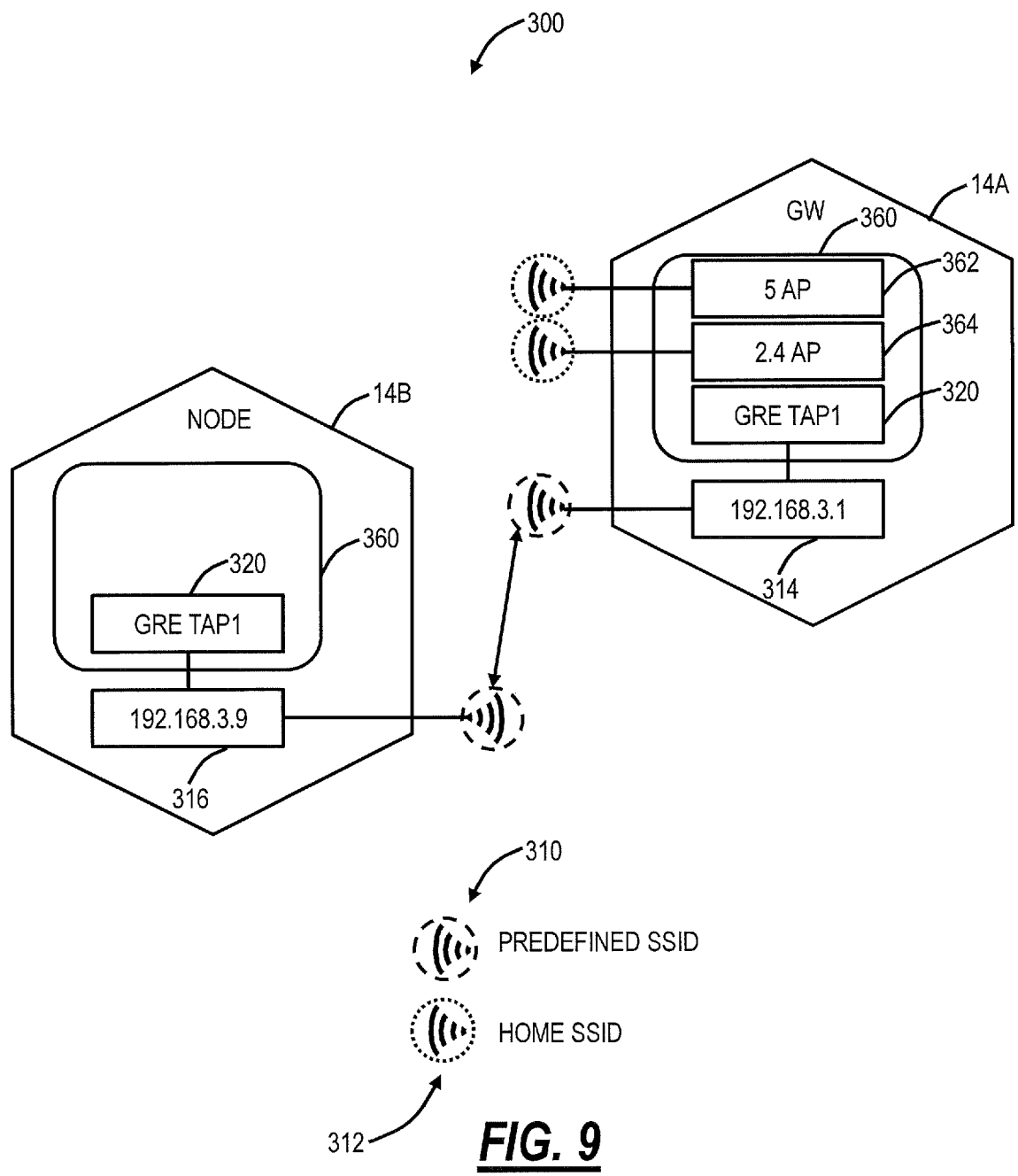
FIG. 9 is a network diagram of the Wi-Fi network of FIG. 7 connecting bridge interfaces with the L2 tunnels.

Referring to FIG. 9, in an exemplary embodiment, a network diagram illustrates the Wi-Fi network 300 connecting bridge interfaces with the L2 tunnels. Most modern operating systems targeting network devices feature software implementation of L2 learning Media MAC bridge (hereafter referred as a bridge interface 360). In order to enable full network service for all Wi-Fi client devices 16 connected to a distributed Wi-Fi network (i.e., the Wi-Fi network 300, the distributed Wi-Fi system 10, etc.), all infrastructure mode interfaces must be a "bridge," i.e., connected to the same bridge interface 360 or to the series of bridge interfaces transparently connected between themselves.

For a traditional single AP Wi-Fi solution, the infrastructure mode Wi-Fi interfaces are already locally bridged, i.e., connected to the same bridge interface residing on the devices. This is because all dual band Wi-Fi access points have two Wi-Fi interfaces, each for one band. In addition, if the Wi-Fi router features wired IEEE 802.3 Local Area Network (LAN) ports, these ports are also bridged to the Wi-Fi interfaces. This allows all devices connected to the same router to have full L2 network visibility, meaning that all L2 protocols will be applicable between devices.

In the case of a distributed Wi-Fi network as disclosed herein, there may not be LAN ports required to be connected to the bridge interface 360. There are, however, several Wi-Fi infrastructure mode interfaces 362, 364, two on each dual band access point acting as a repeater within the distributed Wi-Fi system 10. On each node, the bridge interface 360 must be created and connected to both Wi-Fi interfaces 362, 364 on the device. In addition, these bridges 360 need to be somehow connected. The L2 tunnels, described in previously, are used for this purpose.

As soon as the L2 tunnel is established at both ends, the GRE tunnel interfaces are added to the bridge interface 360, i.e., the GRETAP network interface 320 can be added to the bridge interface 360. Repeating this process on every device which is part of the Wi-Fi network ensures full L2 network connectivity between any two clients in the Wi-Fi network 300, as well as full networking service to any client, through the gateway access point 14A.

Figure 10:
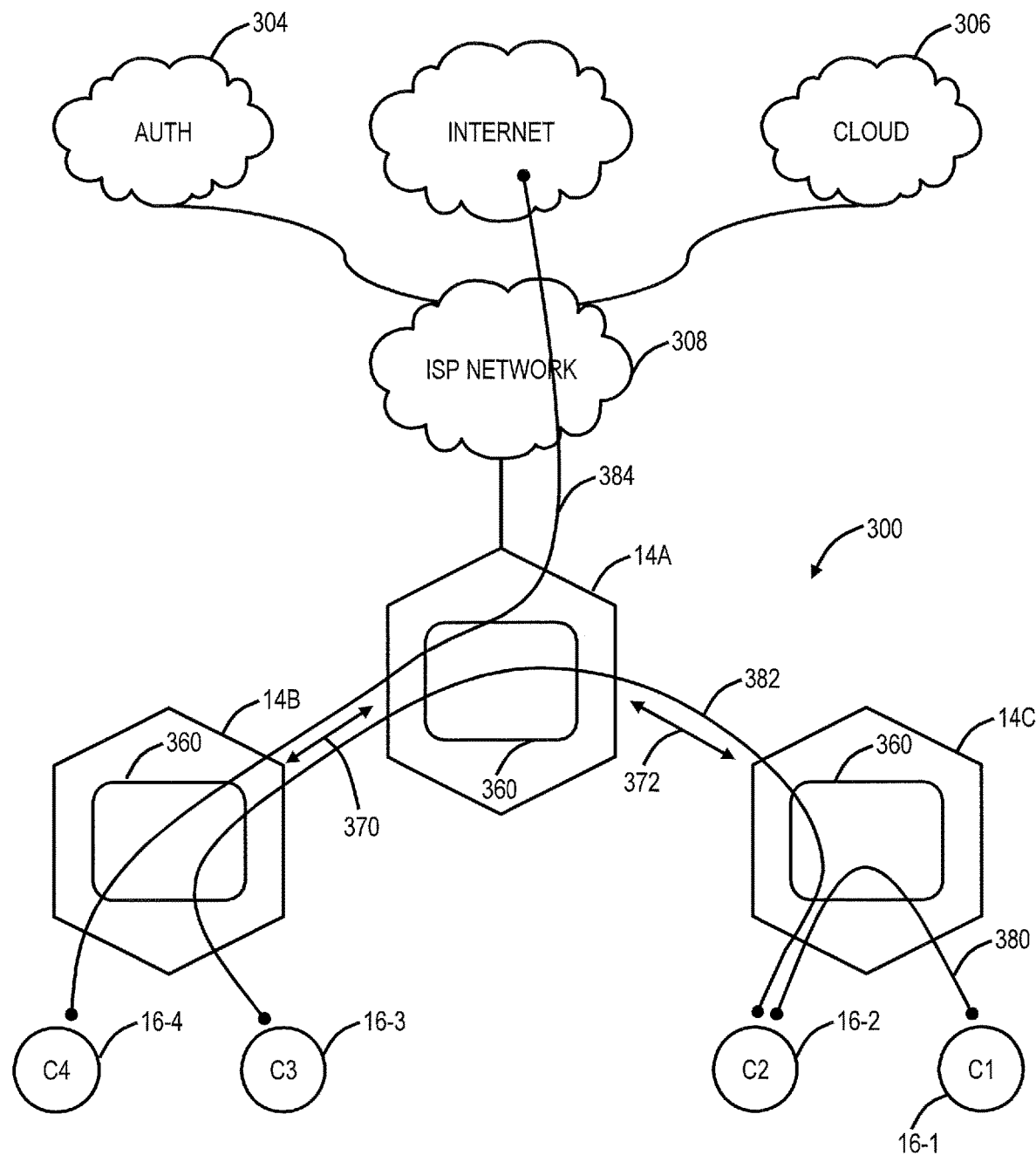
FIG. 10 is a network diagram of the Wi-Fi network of FIG. 7 illustrating the data path between Wi-Fi client devices.

Referring to FIG. 10, in an exemplary embodiment, a network diagram illustrates the Wi-Fi network 300 illustrating the data path between Wi-Fi client devices 16. Here, the Wi-Fi network 300 is shown with the access point 14A as the gateway node and the parent node to the access points 14B, 14C which are child nodes. Each of the access points 14A, 14B, 14C include the bridge interfaces 360, and there is an L2 tunnel 370 between the access points 14A, 14B and an L2 tunnel 370 between the access points 14A, 14C.

If two clients 16-1, 16-2 connected to the same access point 14C over Wi-Fi talk to each other, the packet sent by the client 16-1 to the client 16-2 enters the local bridge interface 360 and will be forwarded directly to the client 16—and vice versa as shown in data path 380. In case the clients 16-2, 16-3 need to talk to each other, the packet generated by the client 16-3 will enter the local bridge interface 360 and be the forwarded to the local bridge interface 360 on the client 16-2 and then forwarded to client 16-3 as shown in data path 382. If the packet is destined to outside network or service 304, 306, the packet will be forwarded to the gateway access point 14A. On the gateway access point 14A, this packet will be routed to the next router in the router chain as shown in data path 384. The packet that enters the gateway node will be forwarded based on the destination MAC address using the same data path as in the opposite direction.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Wi-Fi network with a plurality of access points configured for Wi-Fi client bridging using Layer 2 (L2) tunnels, the Wi-Fi network comprising:
   a plurality of access points each being one or more of a parent node, a child node, and a gateway node in the Wi-Fi network;
   wherein the plurality of access points are interconnected in a tree topology via a plurality of backhaul links and wherein each of the plurality of access points are configured to communicate with Wi-Fi client devices via a plurality of client links;
   wherein each of the plurality of backhaul links is formed via a Layer 2 (L2) tunnel over a backhaul Wi-Fi interface between one parent node and one child node defining a branch of the tree topology, wherein the plurality of backhaul links and the plurality of client links each utilize a respective Wi-Fi channel, wherein the respective Wi-Fi channel is determined by an optimization such that any Wi-Fi channel is used including different Wi-Fi channels for different links with at least two backhaul links having different Wi-Fi channels from one another, such that a first backhaul link is configured for communication over a first Wi-Fi channel and a second backhaul link is configured for communication over a second Wi-Fi channel that is different than the first Wi-Fi channel;
   wherein the plurality of backhaul links use a same predefined Service Set Identifier (SSID) which is known to each of the plurality of access points and the L2 tunnel is configured to tunnel any IEEE 802.11 compliant frames without modification between each end,
   wherein each of the plurality of access points includes multiple Wi-Fi interfaces and each of the multiple Wi-Fi interface is connected to a bridge interface that includes a tunnel interface.

2. The Wi-Fi network of claim 1, wherein the child node is an intermediate device in the Wi-Fi network between a Wi-Fi client device and a gateway node, and wherein the backhaul links support IEEE 802.11 compliant frames through the intermediate device via the L2 tunnel.

3. The Wi-Fi network of claim 1, wherein the parent node is a gateway device in the Wi-Fi network connected to one or more child nodes comprising access points in the in the Wi-Fi network using the L2 tunnel interface.

4. The Wi-Fi network of claim 1, wherein the parent node is configured to connect to a cloud service upon powering up and wherein the cloud service configures the L2 tunnel interface.

5. The Wi-Fi network of claim 1, wherein the L2 tunnel on each of the plurality of backhaul links is configured based on an agreed upon Internet Protocol (IP) address convention for the parent node of each L2 tunnel.

6. The Wi-Fi network of claim 1, wherein the Wi-Fi network supports a plurality of data paths comprising a data path between Wi-Fi client devices connected to a same access point, a data path between Wi-Fi client devices connected to different access points, and a data path between a Wi-Fi client device and an external device via a gateway node in the Wi-Fi network.

7. The Wi-Fi network of claim 1, wherein the plurality of access points comprise three logical interfaces comprising a client interface, a child interface for a backhaul link, and a parent interface for a backhaul link.

8. The Wi-Fi network of claim 7, wherein each of the plurality of access points operate Dynamic Host Configuration Protocol (DHCP) on the parent interface to provide addresses to one or more child nodes.

9. The Wi-Fi network of claim 7, wherein a cloud service is configured to configure Dynamic Host Configuration Protocol (DHCP) on the parent interface.

10. The Wi-Fi network of claim 1, wherein the plurality of access points utilize a first Service Set Identifier (SSID) for the client links and a second SSID for the backhaul links.

11. An access point in a Wi-Fi network configured for Wi-Fi client bridging, the access point comprising:
 a plurality of radios communicating on the Wi-Fi system; and
 a plurality of network interfaces communicatively coupled to the plurality of radios, wherein the network interfaces comprise a Layer 2 (L2) tunnel interface, a plurality Wi-Fi interfaces, and a bridge interface connecting the L2 tunnel interface to each of the plurality of Wi-Fi interfaces;
 wherein the L2 tunnel interface is communicatively coupled to a backhaul Wi-Fi interface of the plurality Wi-Fi interfaces, wherein the bridge interface is configured to communicate IEEE 802.11 compliant frames without modification between the L2 tunnel interface and the plurality of Wi-Fi interfaces, and wherein the Wi-Fi network comprises a plurality of nodes with intra-node communication via the L2 tunnel interfaces such that each intra-node connection defines a backhaul link formed via an L2 tunnel over the backhaul Wi-Fi interface between a parent node and a child node defining a branch of a tree topology, wherein the plurality of nodes utilize a first Service Set Identifier (SSID) for client links and a second SSID for backhaul links, wherein the client links and the backhaul links each utilize a respective Wi-Fi channel, and wherein the respective Wi-Fi channel is determined by an optimization such that any Wi-Fi channel is used including different Wi-Fi channels for different links with at least two backhaul links having different Wi-Fi channels from one another, such that a first backhaul link is configured for communication over a first Wi-Fi channel and a second backhaul link is configured for communication over a second Wi-Fi channel that is different than the first Wi-Fi channel, and
 wherein the backhaul Wi-Fi interface communicates over a radio using a same predefined Service Set Identifier (SSID) which is known to each access point configured to operate in the Wi-Fi network.

12. The access point of claim 11, wherein the access point is an intermediate device in the Wi-Fi network between a Wi-Fi client device and a gateway node and the bridge interface support IEEE 802.11 compliant frames through the intermediate device.

13. The access point of claim 11, wherein the access point is a gateway device in the Wi-Fi network connected to one or more child nodes comprising access points in the in the Wi-Fi network using the L2 tunnel interface.

14. The access point of claim 11, wherein the access point is configured to connect to a cloud service upon powering up to enable an infrastructure mode on a Wi-Fi interface and to assign an Internet Protocol (IP) address thereto, and wherein the cloud service configures the L2 tunnel interface based on the IP address.

15. The access point of claim 11, wherein the Wi-Fi network supports a plurality of data paths comprising a data path between Wi-Fi client devices connected to the access point, a data path between Wi-Fi client devices connected to the access point and another access point, and a data path between a Wi-Fi client device and an external device via a gateway node in the Wi-Fi network.

16. The access point of claim 11, wherein the access point comprises three logical interfaces comprising a client interface, a child interface for a backhaul link, and a parent interface for a backhaul link.

17. A method for Wi-Fi client bridging in a Wi-Fi network, the method comprising:
 receiving uplink data from one or more Wi-Fi client devices via a Wi-Fi network interface;
 forwarding the uplink data to a parent node via a Layer 2 (L2) tunnel adding a tunnel header thereon;
 receiving downlink data from the L2 tunnel; and
 transmitting the downlink data to the one or more Wi-Fi client device,
 wherein the Wi-Fi network comprises a plurality of nodes with intra-node communication via the L2 tunnels and a plurality of L2 tunnels forming backhaul links such that each intra-node connection defines a backhaul link formed via an L2 tunnel over the backhaul Wi-Fi interface between a parent node and a child node defining a branch of a tree topology,
 wherein the backhaul links use a same predefined Service Set Identifier (SSID) which is known to each of the plurality of nodes and the L2 tunnels are configured to tunnel any IEEE 802.11 compliant frames without modification between each end, wherein the backhaul links each utilize a respective Wi-Fi channel, and wherein the respective Wi-Fi channel is determined by an optimization such that any Wi-Fi channel is used including different Wi-Fi channels for different links with at least two backhaul links having different Wi-Fi channels from one another, such that a first backhaul link is configured for communication over a first Wi-Fi channel and a second backhaul link is configured for communication over a second Wi-Fi channel that is different than the first Wi-Fi channel, and
 wherein each of the plurality of access points includes multiple Wi-Fi interfaces and each of the multiple Wi-Fi interfaces is connected to a bridge interface that includes a tunnel interface.

* * * * *